US010600030B2

(12) United States Patent
Sagi et al.

(10) Patent No.: US 10,600,030 B2
(45) Date of Patent: Mar. 24, 2020

(54) SYSTEMS AND METHODS FOR PROVIDING SECURE DOCUMENT DELIVERY AND MANAGEMENT INCLUDING SCHEDULING

(75) Inventors: Surya R. Sagi, Southbury, CT (US); Bernard E. Gracy, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 1929 days.

(21) Appl. No.: 13/341,942

(22) Filed: Dec. 31, 2011

(65) Prior Publication Data

US 2012/0179606 A1  Jul. 12, 2012

Related U.S. Application Data

(60) Provisional application No. 61/430,467, filed on Jan. 6, 2011.

(51) Int. Cl.
*G06Q 10/10* (2012.01)
*G06Q 20/10* (2012.01)

(52) U.S. Cl.
CPC ......... *G06Q 10/107* (2013.01); *G06Q 10/103* (2013.01); *G06Q 20/102* (2013.01)

(58) Field of Classification Search
CPC .. G06Q 20/102; G06Q 20/322; G06Q 40/025; G06Q 40/00; G06Q 40/04; G06Q 10/02; G06Q 10/0833; G06Q 20/0425; G06Q 20/1085; G06Q 20/14; G06Q 20/20; G06Q 20/22; G06Q 20/327; G06Q 20/341
USPC .......................................................... 705/40
See application file for complete search history.

(56) References Cited

U.S. PATENT DOCUMENTS

| 6,006,211 A | 12/1999 | Sansone et al. |
| 6,859,212 B2 * | 2/2005 | Kumar ..................... G06F 9/547 715/744 |
| 7,610,245 B2 * | 10/2009 | Dent ....................... G06Q 20/04 705/40 |

(Continued)

FOREIGN PATENT DOCUMENTS

| EP | 0917076 | * | 5/1999 |
| EP | 1016997 | * | 7/2000 |

OTHER PUBLICATIONS

PCT/US2012/020410 International Search Report.

*Primary Examiner* — Hani M Kazimi
*Assistant Examiner* — Paul R Kloberg
(74) *Attorney, Agent, or Firm* — Brian A. Lemm; Charles R. Malandra, Jr.

(57) ABSTRACT

Systems and methods for integrated management and scheduling of events associated with both physical and digital mail are provided. A print stream processor utilizes recipient preferences to determine that a mail piece should be delivered by physical mail. The server then processes the mail piece print stream to extract time sensitive data such as a payment amount and due date. The server utilizes the identity of the physical mail piece recipient and the time sensitive data to provide a scheduling message to the recipient. Here, the scheduling message includes injecting a calendar entry to a centralized mail management system having an account for the recipient. Additionally, reminder messages are provided to the recipient based upon recipient and/or sender preferences. Similarly, entries relating to physical coupons or other offers sent to the recipient are placed on the recipient's calendar including offer deadline entries.

7 Claims, 8 Drawing Sheets

(56) References Cited

U.S. PATENT DOCUMENTS

| | | | |
|---|---|---|---|
| 7,672,879 B1 * | 3/2010 | Kumar | G06Q 10/109 705/30 |
| 7,731,089 B2 | 6/2010 | Chang et al. | |
| 7,933,834 B2 * | 4/2011 | Kumar | G06F 21/41 705/42 |
| 8,380,623 B1 * | 2/2013 | Ley et al. | 705/39 |
| 8,423,452 B1 * | 4/2013 | Ley et al. | 705/38 |
| 2002/0069168 A1 | 6/2002 | Lee et al. | |
| 2008/0155547 A1 | 6/2008 | Weber et al. | |
| 2009/0271303 A1 | 10/2009 | Weng et al. | |

* cited by examiner

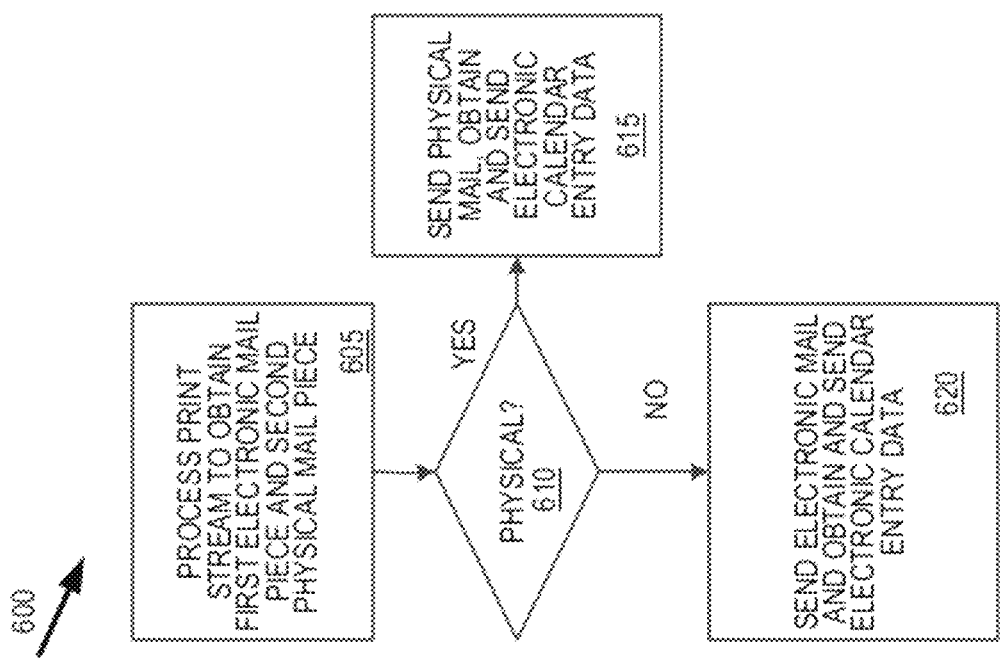
FIG. 6
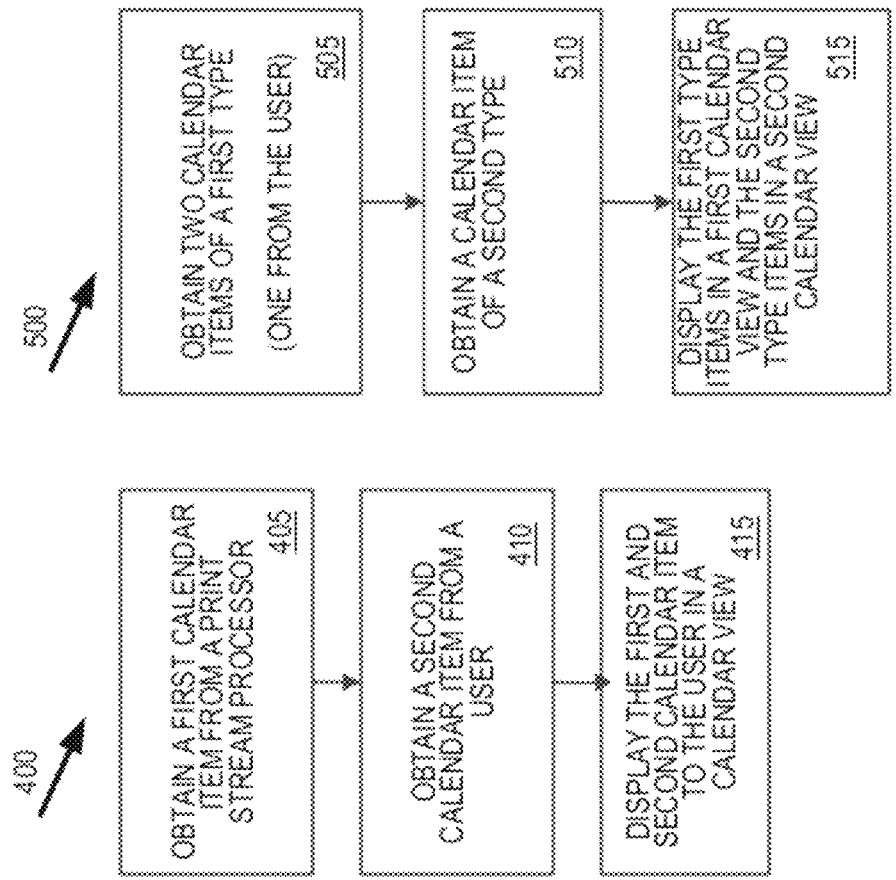
FIG. 5
FIG. 4

Bills and Statements — 910

December 2010

FIG. 9

My Profile

Account Information - Alerts

FIG. 10

SYSTEMS AND METHODS FOR PROVIDING SECURE DOCUMENT DELIVERY AND MANAGEMENT INCLUDING SCHEDULING

CROSS REFERENCE TO RELATED APPLICATIONS

This application claims priority under 35 U.S.C. section 119(e) from Provisional Patent Application Ser. No. 61/430,467, filed Jan. 6, 2011, entitled Systems and Methods for Providing Secure Electronic Document Storage, Retrieval and Use, by Surya R. Sagi, et al., which is incorporated herein by reference in its entirety.

TECHNICAL FIELD

The illustrative embodiments of the present application relate generally to document delivery systems and, more particularly, to new and useful systems and methods for managing mail documents including creating recipient reminders and calendar entries.

BACKGROUND

In the United States, many people are utilizing electronic access to financial and other transactional accounts. Additionally, there has been significant adoption of electronic bill payment in recent years, with electronic payment now outpacing payment by putting a check in the mail. However, many people prefer to continue to receive physical delivery of paper statements.

Systems and methods have been described for using a physical mailing address as an electronic mail address. For example, U.S. Pat. No. 7,478,140, entitled System and Method for Sending Electronic Mail and Parcel Delivery Notification Using Recipient's Identification Information, issued Jan. 13, 2009 to King, et al. describes a system using a recipient's physical address.

Digital mail systems exist today that process only digital mail messages that are delivered to digital mail recipients. However, such systems do not provide for the mail recipient to efficiently manage and schedule actions relating to such mail. Moreover, such systems do not provide a user with an integrated environment for managing and scheduling actions relating to both physical and digital mail.

Accordingly, there is a need, among other needs, for systems and methods to provide mail recipients with a convenient, efficient mechanism for managing and scheduling actions related to digital mail. Moreover, there is a need to provide such features in an integrated environment for both physical and digital mail. Moreover, there is a need for such systems that provide calendaring functionality including providing configurable reminders.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

FIG. 4 is a flowchart diagram showing a process for displaying time-sensitive mail piece information to a recipient according to an illustrative embodiment of the present application.

FIG. 5 is a flowchart diagram showing a process for displaying time-sensitive mail piece information to a recipient according to an illustrative embodiment of the present application.

FIG. 6 is a flowchart diagram showing a process for creating time-sensitive mail piece information messages relating to a mail piece according to an illustrative embodiment of the present application.

FIG. 9 is a diagram showing a screen display of a calendar view display according to an illustrative embodiment of the present application.

FIG. 10 is a diagram showing a screen display of a reminder alert profile setup page according to an illustrative embodiment of the present application.

SUMMARY

Figure 1:
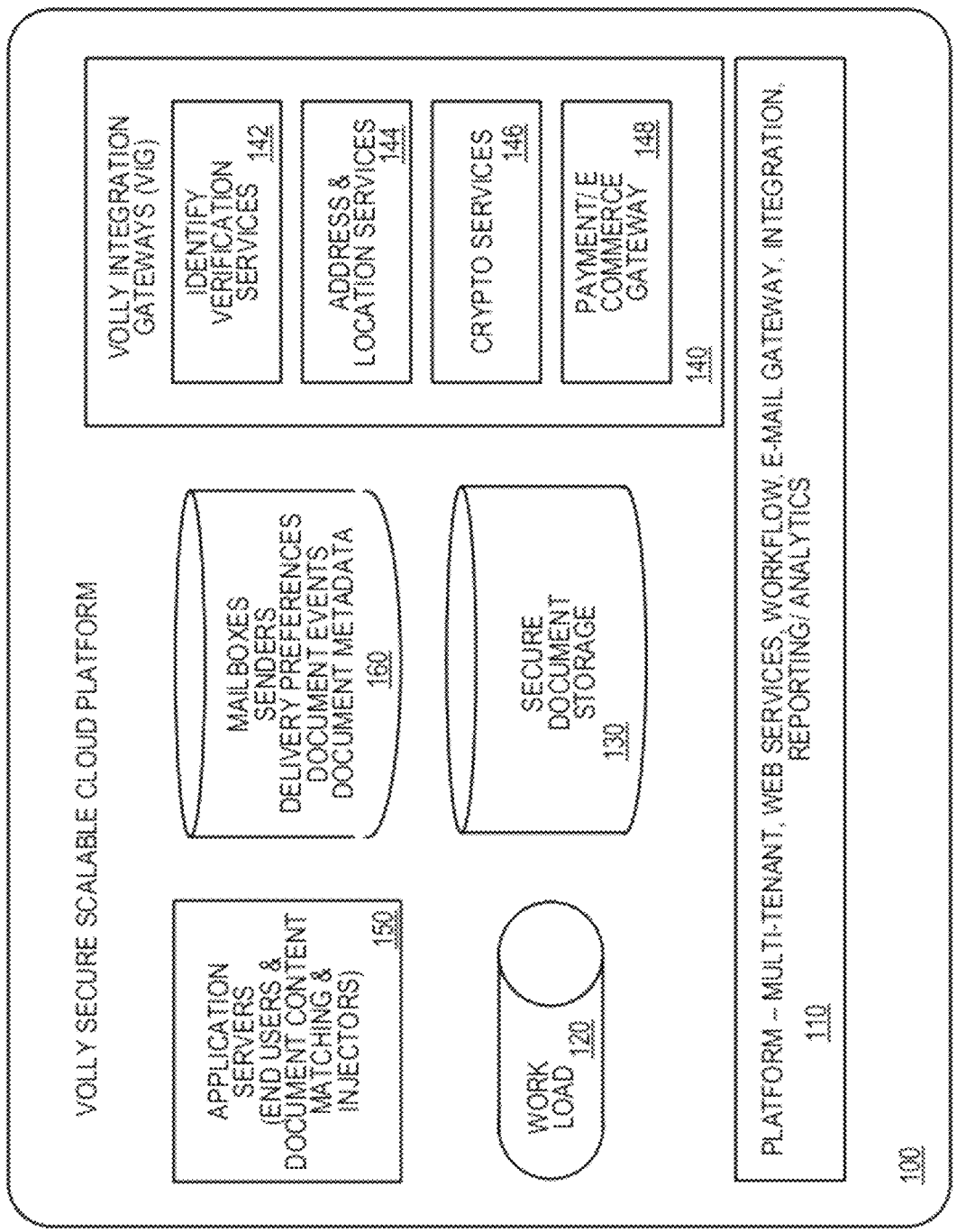
FIG. 1 is a schematic diagram showing a system for providing integrated mail storage and management according to an illustrative embodiment of the present application.

Illustrative systems and methods for allowing a mail recipient to manage and schedule events relating to mail are provided. In at least certain embodiments, a user receives automatic calendar entries and inputs manual calendar entries related to digital mail. For example, a computer system for organizing mail communications and scheduling related actions for a mail recipient user includes a mail notification subsystem configured to provide a calendar display to the user, wherein the calendar display is configured to display at least two items, the first one of the at least two items is automatically received electronically from a print stream processor and includes time sensitive data related to a first mail piece; and the second one of the at least two items is input by the user and includes time sensitive data related to a second mail piece.

In additional alternative embodiments, an integrated calendar is provided for a mail recipient user that receives automotive time sensitive notices such as due date calendar entries related to both physical and digital mail. For example, a print stream processor utilizes recipient preferences to determine that a mail piece should be delivered by physical mail. The server then processes the mail piece print stream to extract time sensitive data such as a payment amount and due date. The server utilizes the identity of the physical mail piece recipient and the time sensitive data to provide a scheduling message to the recipient. Here, the scheduling message includes injecting a calendar entry to a centralized mail management system having an account for the recipient. Additionally, reminder messages are provided to the recipient based upon recipient and/or sender preferences. Similarly, entries relating to physical coupons or other offers sent to the recipient are placed on the recipient's calendar including offer deadline entries.

For example a computer system for organizing mail communications and scheduling related actions for a mail recipient user includes a mail notification subsystem configured to provide a calendar display to the user, the calendar having at least two views, wherein each of the at least two views corresponds to one of at least two mail types; wherein a first view of the at least two views displays at least two items associated with a first one of the at least two mail types and a first one of the at least two items includes time sensitive data related to a first mail piece that is received electronically from a print stream processor and at least a second one of the at least two items includes time sensitive data related to a second mail piece that is input by the user.

In yet additional alternative embodiments, an automated document factory (ADF) includes a print stream processor that separates print streams into digital and physical delivery channels based upon recipient delivery preferences. The ADF is configured to extract time sensitive data from the mail pieces including mail pieces sent physically and mail pieces sent electronically. The ADF then creates scheduling messages such as calendar entries that are sent to a system for calendar display to the recipient For example, a computer implemented method for sending mail scheduling data to an integrated mail information system, the integrated mail information system used by a first user and a second user utilizing the computer to process at least one print stream, and in processing the at least one print stream, processing a first mail piece directed to the first user and a second mail piece directed to the second user, includes determining that the first mail piece is to be delivered electronically, determining that the second mail piece is to be delivered physically, obtaining first time sensitive data from the print stream associated with the first mail piece, obtaining second time sensitive data from the print stream associated with the first mail piece, creating a first mail scheduling message including the first time sensitive data, creating a second mail scheduling message including the first time sensitive data, sending the first mail piece to the first user electronically, sending the first mail scheduling message electronically to the integrated mail information system for display to the first user, sending the second mail piece to a physical delivery subsystem for physical delivery to the second user, and sending the second mail scheduling message electronically to the integrated mail information system for display to the second user.

Several additional alternatives are disclosed and described herein.

DETAILED DESCRIPTION

The present invention is described in the context of illustrative embodiments directed to new and useful systems and methods for allowing mail recipients to manage and schedule events relating to mail. Several illustrative embodiments described herein refer interchangeably to the VOLLY secure digital delivery service, digital mailbox system (DMB) or Digital Mail Platform (DMP). The illustrative system provides a closed, secure, end-to-end system that consolidates and digitally delivers items, also called mail pieces, such as mail, transaction statements, marketing promotions, catalogs and other rich media from businesses to consumers. This delivery may be based upon the recipient's (user, consumer) physical street address. The illustrative embodiments provide a novel consumer experience, allowing customers to help manage their lifestyles with greater convenience and control. This new communications channel provides benefits to mailers including by providing a low-cost yet trusted and secure electronic distribution platform, with minimal expense in switching from existing mailing processes including physical mailing processes. Moreover, mailers (senders, billers, etc.) are provided the opportunity to provide electronic metadata such rich time-sensitive data to the recipients, even if the mail pieces are delivered physically.

Consumers are provided several benefits including the ability to aggregate mail digitally from multiple providers, to enjoy secure remote access from a single log-in, and to choose from a wealth of options for sorting, prioritizing, processing, paying, archiving, retrieving, discarding and reporting on all their mail-based activities across numerous electronic client platforms including smart phones, tablets, laptop computers, desktop computers and other network capable computing devices. Moreover, the consumers are provided enhanced management and scheduling tools to aggregate time-sensitive data for mail pieces received electronically, by physical mail and/or by user uploading of documents into the system such as for secure storage and record keeping. Additionally, it may offer consumers opt-in control over how they will be marketed and communicated to, and in what format. Here, an illustrative calendar based system for organizing reminders and notices as well as facilitating follow-on actions related to digital documents including mail, transaction statements, marketing promotions, catalogs and rich media is described. Mail pieces herein can refer to letters, bills, statements, postcards, flyers, offers, catalogs and other types of mail that are commonly received.

Several illustrative hardware and software systems and subsystems are described herein that may be implemented using one or more alternative architectures. Here, in an alternative applicable to any of the embodiments the system is implemented on a cloud based platform using Infrastructure as Service (IaaS) architecture for processing and storage such as the RACKSPACE CLOUD, and TERREMARK ECLOUD platform or the AMAZON EC2 platform. Alternatively, the systems, processes and storage functions described may be implemented using other hosting architectures such as in-house, dedicated hosting, shared hosting or some other hosting model. As a further alternative, the MICROSOFT AZURE platform may be utilized.

Several illustrative hardware and software systems and subsystems are described herein that may advantageously utilize certain available components. For example, automated document factories having many configurations may be purchased from Pitney Bowes Inc. located in Stamford, Conn. Similarly, certain print-to-mail systems are available from the Pitney Bowes Emtex and Pitney Bowes Business Insight subsidiaries of Pitney Bowes Inc. located in Stamford, Conn. Systems herein may utilize print stream processing systems, document printing, insertion and franking systems and electronic bill presentment and payment (EBPP) systems available from Pitney Bowes Inc. The servers described are typically INTEL architecture servers such as DELL servers using the WINDOWS SERVER operating system software and the databases utilize APACHE CASSANDRA database systems. Alternatively, ORACLE database systems may be utilized. Additionally, the illustrative embodiments are described as enhancements to previously commercially available software systems marketed by EMTEX available from Pitney Bowes Inc. of Stamford, Conn.

Additionally, certain outgoing mail print stream processing systems have been described for separating documents in a print stream or batch into two separate print streams—a physical delivery print stream and an electronic delivery print stream based on customer delivery preferences. Commonly-owned U.S. Pat. No. 6,343,327, entitled System and Method for Electronic and Physical Mass Mailing, issued to Daniels, Jr., et al. on Jan. 29, 2002 describes such systems and is incorporated by reference herein in its entirety. Such systems described therein may be modified using the systems, processes and techniques described herein to provide an initial delivery channel with a backup channel that is used when deemed necessary.

Mail pieces such as variable data documents that are printed and mailed (i.e. statements, invoices, targeted marketing communications) often contain time sensitive information. It is essential for document owners (senders) to ensure timely delivery of these documents to their customers. Moreover, it is often financially beneficial if recipients take action on the mail piece timely. Traditionally, these documents are printed and mailed to customers. A growing number senders and customers are seeking electronic delivery options. If the electronic delivery is misplaced or not properly organized, the lost messages can cause payment or purchasing delays that have negative cash flow impact to the sender and penalties or lost opportunities for recipient customers.

Several illustrative embodiments of digital mailbox system designs are described that may be implemented for use alone or in various combinations.

Referring to FIG. 1, a schematic diagram showing a system 100 for providing integrated mail storage and management according to an illustrative embodiment of the present application is disclosed. In this illustrative embodiment, the platform 110 is hosted in an economical, scalable, multi-tenant cloud facility that provides for web services, workflow development and deployment, an e-mail gateway, external system integration and reporting/analytics facilities. Such a system provides for seamless redundancy, load balancing and geographic balancing. Several application server components are deployed such as an end user interface to handle end user mail piece recipient access to the system such as through PC browser based interface through the Internet or other appropriate network. Document content injectors and content processing systems are deployed. A process server 120 is deployed for executing system functionality.

The Recipient Mailbox framework and related data such as sender and recipient preference profile storage, document event storage and document metadata storage are provided for in memory storage 160. Secure document storage 130 is provided to store the received mail piece content documents such as PDF format documents received from mailers and PDF format documents scanned and uploaded by the user. Moreover, document metadata includes metadata associated with physically mailed mail pieces that are not necessarily stored in the electronic secure document storage 130. As described herein, time-sensitive data for physically mailed documents may be stored and displayed/manipulated by the user/recipient. In such situations, a document identifier is assigned to a mail piece that is physically mailed and the identifier is used to store and retrieve metadata from data store 160 for display and manipulation in the system. If the user later elects to upload a scan of the mail piece, the system may allow the user to associate the scan with the previously input document identifier. For example, a user with system ID=99 could have a paper document ID for an uploaded document of P000000099000001 and an electronic document ID for a delivered document of E000000099000001, where the letters P and E distinguish paper from electronic and 99 is the customer number. Additionally a multiple digit document type filed can be added such as 0001 for bills resulting in P000000099001000001 for a document identifier P(USER)(TYPE)(DOC). Alternatively UUID schemes may be used. If the user selects both (B) digital and physical delivery, the document identifier would be B000000099001000001.

Several illustrative gateways 140 are implemented in the cloud system including an identity verification gateway 142 that is used to verify the identity of system users/mail piece recipients. Additionally, address and location services gateways 144 are provided. A payment services/ecommerce gateway is provided to process bill payment and ecommerce activity such as catalog orders and promotional offer redemption activity. Certain cryptography functions may be implemented outside of the cloud system, so a cryptography services gateway 146 is provided. The internetworking connections may be secured using standard security processes and the documents and metadata/profiles may be encrypted.

In certain embodiments, a digital mailbox will be created for every individual living at every delivery point in the targeted geography of the DMP system. In such cases, the Digital Mail Platform provides an alternative delivery channel for items including mail, transaction statements, direct mail and catalogues by consolidating mail for consumers based on street address of the recipients. In such an illustrative embodiment, the Digital Mail Platform has at least 3 major systems and several subsystems interfacing to other products/systems for value added services. In a consumer mashup system, each consumer associate with street address and receive communications aggregated at address based digital mailboxes. The core platform system establishes digital mailboxes and associate the content received from mailers & publishers to consumers and provide additional value added services. The Secure Mailer Gateway creates content for digital mailboxes with required metadata and security. System will split and send e-Delivery of mail that has been opted in for e-Delivery.

Consumers are able to access their mail from different web/e-mail/mobile clients digitally with security and content certification. The Digital Mailbox will help consumers manage their life better and should offer features beyond just mail management. The Digital Mail Platform provides an ecosystem which is secure, economical and competitive for high volume mailers, postal carriers and consumers. The illustrative systems described herein may facilitate large scale systems to accommodate mail traffic consistent with country-wide activity or even larger regional or global traffic. The U.S. population is over 300 million people. Additionally, the number of valid physical street addresses in the U.S. postal system is greater than 110 million addresses. It is possible that a Digital Mail Platform could handle mail segment volumes including Potential Transaction statements of 1 Billion pieces/year and Potential Direct Mail of 2 Billion pieces/year, or more. Each digitized document might average 200 Kbytes or more using one or more formats. Such as system may support 2 Million concurrent users and may support very fast response time for various user requests such 2 seconds for login and 1 second to view a mail piece.

Figure 2:
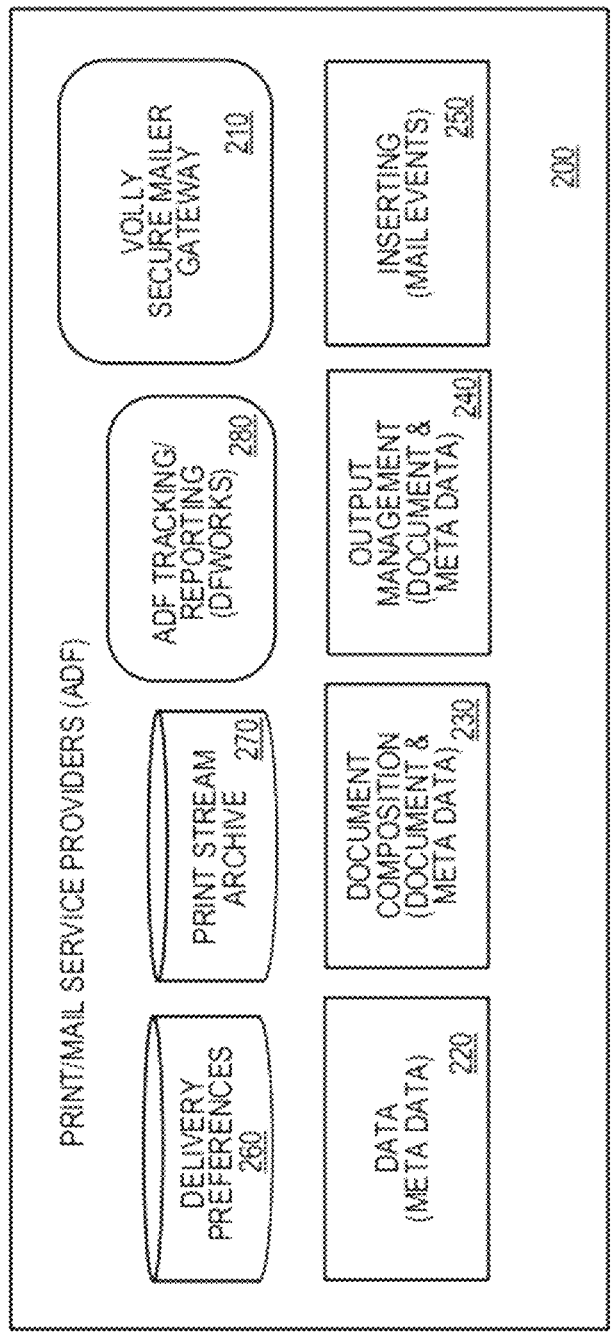
FIG. 2 is a schematic diagram showing an automated document factory for providing mail information according to an illustrative embodiment of the present application.

Referring to FIG. 2, a schematic diagram showing an automated document factory (ADF) 200 for providing mail information according to an illustrative embodiment of the present application is disclosed. Here, the ADF 200 may be implemented at a large company mail center, an outsourced mail center and/or an aggregate mail processing center. Recipient delivery preferences may be stored locally for company clients 260, may be integrated into the print stream or may be queried from an offsite data source during or shortly prior to print stream processing activities. Accordingly, when a financial institution processes a large batch of credit card statements to be sent to tens of thousands of recipients, they may be processed by such an ADF. A print stream archive may be maintained in memory storage 270.

The DFWORKS system 260 available from Pitney Bowes Inc. of Stamford, Conn. may be utilized for ADF tracking and reporting. Metadata is stored in memory storage 220, document composition to create/add/store/manipulate metadata occurs in server 230, output management for document and metadata output (including time-sensitive data such as calendar entries) are processed by server 240. A mail event inserter process runs on server 250 to provide for targeted promotional offer insertion, etc. Finally, the VOLLY secure mailer gateway system obtains electronic delivery data from the ADF for electronic mail pieces and physical mail pieces (meta data) for delivery into the VOLLY cloud architecture in the proper format.

Figure 3:
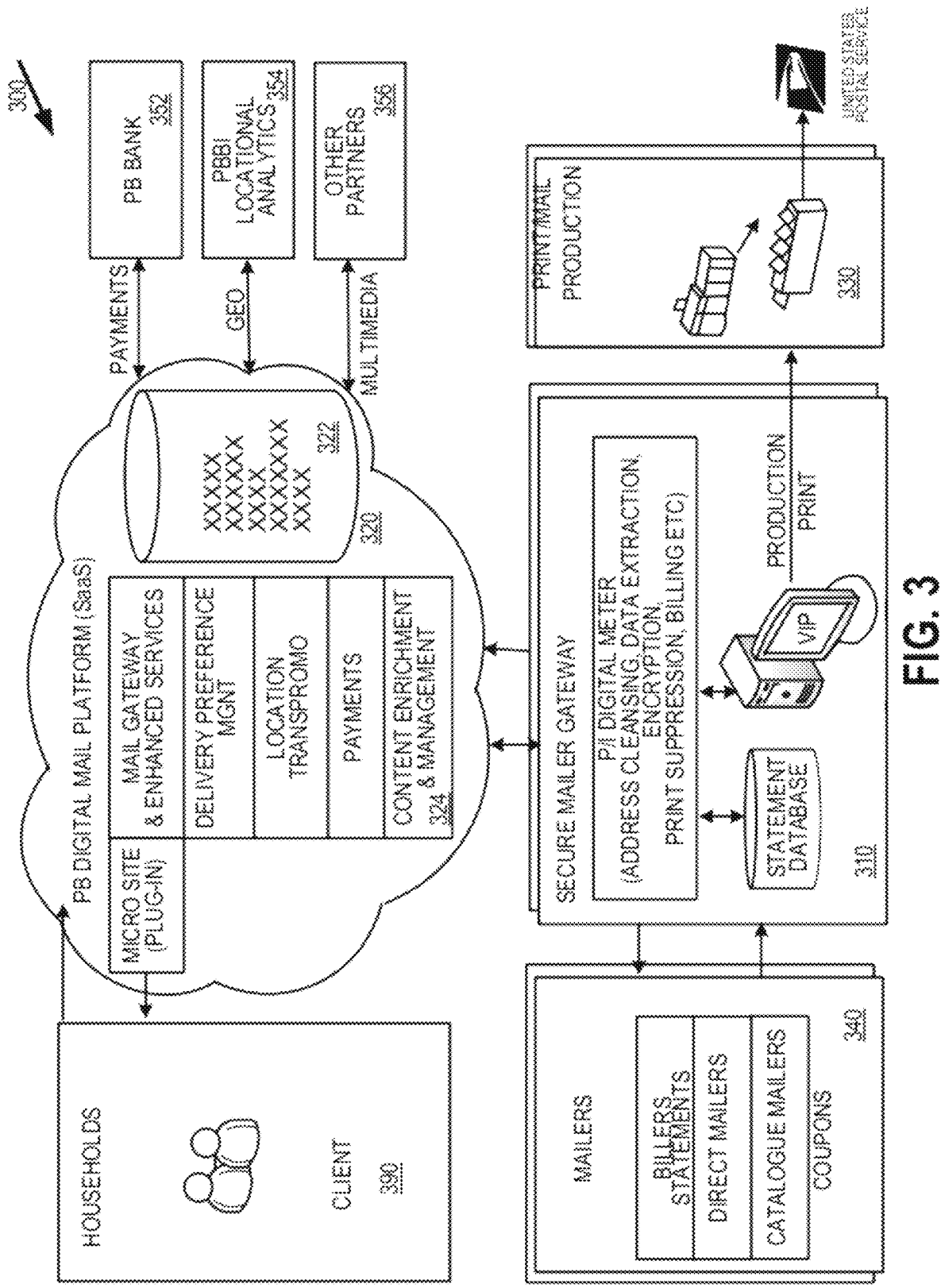
FIG. 3 is a schematic diagram showing a mail system according to an illustrative embodiment of the present application.

Referring to FIG. 3 is a schematic diagram showing a mail system 300 according to an illustrative embodiment of the present application. The system 300 provides the entire ecosystem for creation/delivery and processing of mail pieces delivered electronically and physically. Here, the household client, recipients and users of the system 390 typically use a PC based browser to access the DMP through the Internet or through some other suitable connection such as a wireless connection. The many diverse mailers 340 are represented and will process bills, statements, direct promotional mail, catalogues, coupons, etc. An automated document factory includes digital processing 310 and physical processing 330. The physical mail pieces in this illustrative embodiment are delivered by the United States Postal Service (USPS). The DMP 320 is connected to partners such as payment partners 352 for processing payments, location data partners 354 and other partners 356. Cloud processing services are hosted in cloud processing facility 324 and storage is shown at 322.

Referring to FIG. 4, a flowchart diagram showing a process 400 for displaying time-sensitive mail piece information to a recipient according to an illustrative embodiment of the present application is disclosed. In step 405, the system obtains a first calendar item from a print stream processor. Here, the mail piece is processed by an ADF such as for digital delivery as described above. The print stream process extracts time-sensitive data from the print stream such as by using a template or is separately provided the metadata in an expected format. For example, a processed bill with a due date of Dec. 31, 2011 and due amount of $100.00 would result in a calendar entry message having that due date with that amount. Such calendar message may also trigger additional reminders by sender and/or recipient preference as described below.

In step 410, the system obtains a second calendar item directly from the user. In this way, the user may utilize the VOLLY calendar as a centralized bill organization and processing tool. Here, the associated mail piece was not initially processed or received using the VOLLY system, but the user injects relevant data into the user account within the VOLLY system. In step 415, the VOLLY system provides an integrated calendar display having both automatically received mail piece item data such as data relating to electronically received mail pieces and additional mail piece data related to mail pieces that were not initially processed by the system.

In one illustrative embodiment, a computer system for organizing mail communications and scheduling related actions for a mail recipient user includes a mail notification subsystem configured to provide a calendar display to the user, wherein the calendar display is configured to display at least two items, the first one of the at least two items is automatically received electronically from a print stream processor and includes time sensitive data related to a first mail piece, and the second one of the at least two items is input by the user and includes time sensitive data related to a second mail piece.

In an alternative system, the first mail piece comprises a bill and the corresponding time sensitive data includes a due data and a due amount. In another alternative system, the second mail piece comprises an offer and the corresponding time sensitive data includes an expiration date associated with the offer. For example, the offer may include a discount for paying the bill early. The offer may include a coupon unrelated to a mail piece that was delivered with a mal piece. Furthermore, the offer may have been received in a separate mail piece, with a group of coupon offers or in a catalog. In yet another alternative system, the calendar view comprises a monthly view.

In yet another alternative, the mail notification subsystem configured to provide at least one user configurable reminder message to the user related to the first mail piece and the corresponding time sensitive data. For example, the user may setup an alert profile that will provide an alert two days before the due date of any bill. Similarly, the user may setup alerts with respect to an individual mail piece. Furthermore, the mail piece sender may send metadata with an electronically delivered mail piece or associated with a physically delivered mail piece that setup default reminder alerts such as when the particular user profile is configured to receive and process such recommended alerts.

Referring to FIG. 5, a flowchart diagram showing a process 500 for displaying time-sensitive mail piece information to a recipient according to an illustrative embodiment of the present application is disclosed. In step 505, the system obtains two calendar items of a first type, a first calendar item from a print stream processor and a second from the user as described above. Here, the first mail piece is processed by an ADF such as for digital delivery as described above. For example, a processed bill with a due date of Dec. 31, 2011 and due amount of $100.00 would result in a calendar entry message having that due date with that amount. The user then inputs a second mail piece of type "Bill" having a Dec. 29, 2011 due date and an amount of $200.00 due. Here, subtypes may be displayed together or separately. For example, the type bill may have several recognized subtypes including credit card, store charge, car insurance, etc.

In step 510, the system obtains a calendar item of a second type, such as an offer. Here, the offer is processed by an ADF such as for digital delivery as described above. For example, the offer has a due date of Dec. 31, 2011 and relates to a shirt offered for $10.00.

In step 515, the system displays the items of the first type in a single calendar view such as a monthly view. In that view the December 31 bill is shown, but the December 31 offer is not shown. The system then may display a second calendar view such as an additional monthly view in which the December 31 offer is shown, but the December 31 bill is not. In an alternative, two or more views are merged in to a single view, but the items are distinguished such as by color coding the items displayed.

In one illustrative embodiment, a computer system for organizing mail communications and scheduling related actions for a mail recipient user includes a mail notification subsystem configured to provide a calendar display to the user, the calendar having at least two views, wherein each of the at least two views corresponds to one of at least two mail types, wherein a first view of the at least two views displays at least two items associated with a first one of the at least two mail types and a first one of the at least two items includes time sensitive data related to a first mail piece that is received electronically from a print stream processor and at least a second one of the at least two items includes time sensitive data related to a second mail piece that is input by the user.

In an alternative system, the first one of the at least two mail types includes bills and the time sensitive data relating to the first mail piece includes a due data and a due amount. In another alternative, a second view of the at least two views displays at least two items associated with a second one of the at least two mail types and a first one of the at least two items includes time sensitive data related to a third mail piece that is received electronically from a print stream processor and at least a second one of the at least two items includes time sensitive data related to a fourth mail piece that is input by the user, and the second one of the at least two mail types includes offers and the time sensitive data relating to the third mail piece includes an expiration date.

In yet another alternative system, a first view and a second view of the at least two views each comprise a monthly view, and the first and second views may be combined into a single view having distinct coding for items in each of the at least two views. In yet another alternative, the mail notification subsystem configured to provide at least one user configurable reminder message to the user related to the first mail piece. In yet another alternative, the reminder message is created based upon a preference associated with the type associated with the corresponding first mail piece. In yet another alternative, the first mail piece is received as physical mail by the user and is not received electronically. Such a system provides the user with the flexibility to add mail pieces into the system for organizational purposes even if not originally processed by the system.

Referring to FIG. 6, a flowchart diagram showing a process 600 for creating time-sensitive mail piece information messages relating to a mail piece according to an illustrative embodiment of the present application. In step 605, the system processes a print stream to obtain a first mail piece that is determined/flagged to be delivered electronically and a second mail piece that is determined/flagged to be delivered physically. In step 610, the process determines if this particular mail piece is to be delivered physically and if it has time-sensitive data associated with it. If so, in step 615, the system sends the mail piece using the physical channel. It processes the print stream or metadata to obtain the time sensitive information such as due date and due amount for a mail piece type bill. The system then creates the time-sensitive data message such as the calendar data message and sends it to the digital mail system. A unique identifier may be created for the document even though the mail piece is not delivered electronically. The identifier is then used to manage metadata associated with that mail piece such as calendar entries and other processing functions such as bill payment. If the mail piece is to be electronically delivered, the mail piece is processed in step 620 as with the other calendar entries for electronic mail pieces.

In one illustrative embodiment, a computer implemented method for sending mail scheduling data to an integrated mail information system, the integrated mail information system used by a first user and a second user, includes utilizing the computer to process at least one print stream, and in processing the at least one print stream, processing a first mail piece directed to the first user and a second mail piece directed to the second user, determining that the first mail piece is to be delivered electronically, determining that the second mail piece is to be delivered physically, obtaining first time sensitive data from the print stream associated with the first mail piece, obtaining second time sensitive data from the print stream associated with the first mail piece, creating a first mail scheduling message including the first time sensitive data, creating a second mail scheduling message including the first time sensitive data, sending the first mail piece to the first user electronically, sending the first mail scheduling message electronically to the integrated mail information system for display to the first user, sending the second mail piece to a physical delivery subsystem for physical delivery to the second user, and sending the second mail scheduling message electronically to the integrated mail information system for display to the second user.

In an alternative method, the first and second mail scheduling messages comprise calendar data for display in calendar view form. In another alternative method, the calendar view form comprises a monthly view. In yet another alternative method, the first and second mail scheduling messages comprise mail piece type data. In yet another alternative method, the first mail piece comprises a bill and the first time sensitive data comprises a due date and an amount due. In yet another alternative method, the second mail piece comprises an offer and the first time sensitive data comprises an offer deadline.

In another embodiment, the first mail piece comprises a bill and an offer and the first time sensitive data comprises a due date and an amount due associated with the bill, and further includes obtaining third time sensitive data from the print stream associated with the first mail piece, wherein the third time sensitive data includes an expiration date associated with the offer, creating a third mail scheduling message including the third time sensitive data, and sending the third mail scheduling message electronically to the integrated mail information system for display to the first user.

In another alternative method, the first mail piece comprises a bill and an offer and the first time sensitive data comprises a due date and an amount due associated with the bill, further including obtaining third time sensitive data from the print stream associated with the first mail piece, wherein the third time sensitive data includes an expiration date associated with the offer, and wherein the first mail scheduling message further includes the third time sensitive data.

Figure 7:
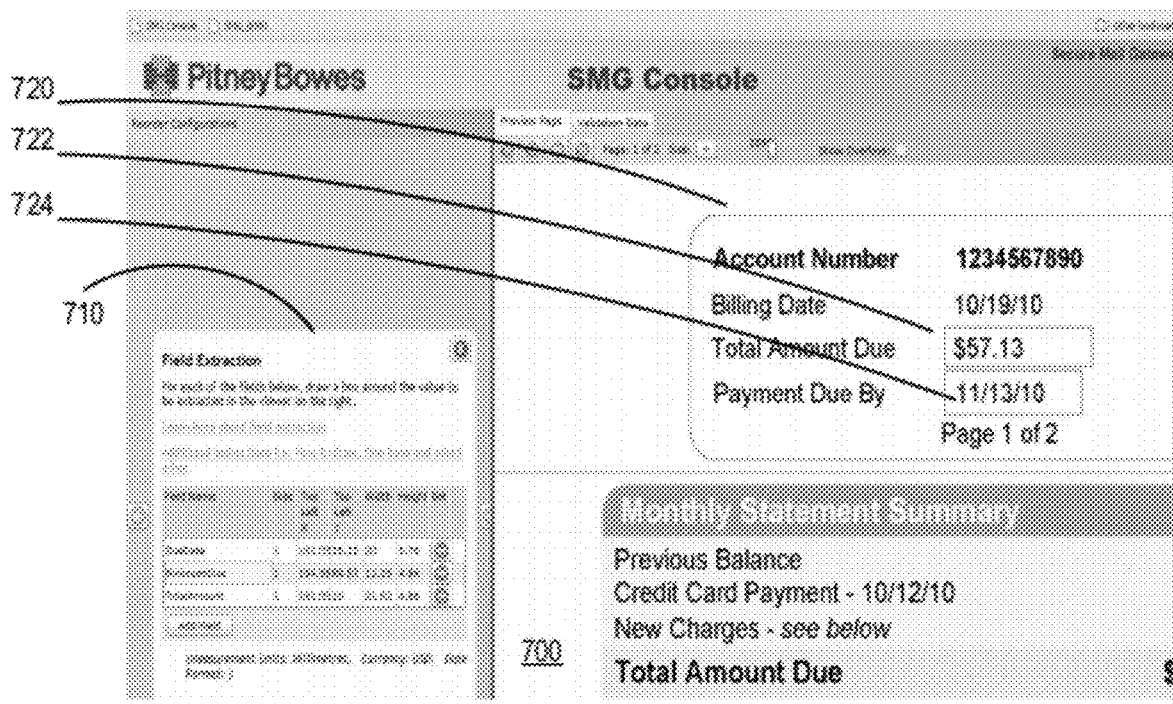
FIG. 7 is a diagram showing a screen display of a print stream processor according to an illustrative embodiment of the present application.

Referring to FIG. 7, a diagram showing a screen display 700 of a print stream processor according to an illustrative embodiment of the present application is disclosed. Here the print stream processor component of the automated document factory is used to process batches of mail pieces of the type bill having a particular format. Here, the field extraction tool 710 is utilized to process the print stream to extract data from the print stream to create metadata. In this case, the metadata created is time sensitive data relating to the sue date and due amount of the particular bill. This time-sensitive information is then used to create a calendar entry message that is used to populate the VOLLY calendar view to provide the user/recipient with enhanced functionality as described herein. Here, data area 710 is mined to obtain the total amount due field 722 of $57.13 and the payment due by date field 724 of Nov. 13, 2010. This information is then used to create a calendar entry as described herein.

Figure 8:
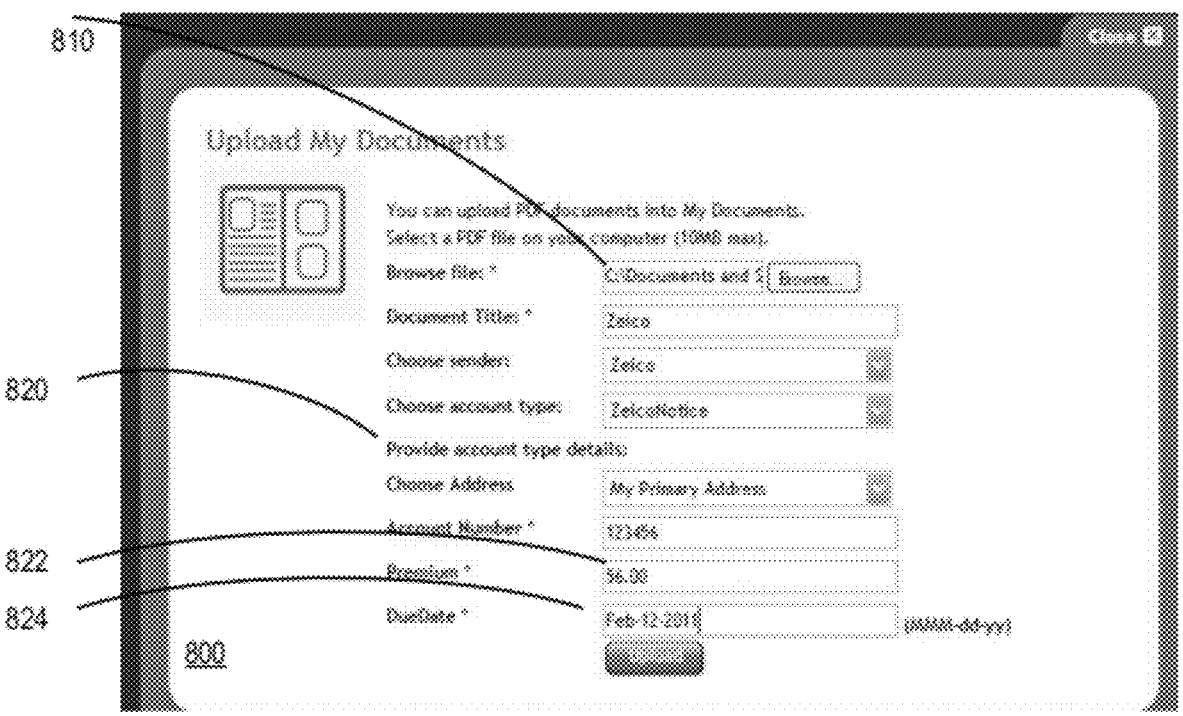
FIG. 8 is a diagram showing a screen display of a document insertion process according to an illustrative embodiment of the present application.

Referring to FIG. 8, a diagram showing a screen display 800 of a document insertion process according to an illustrative embodiment of the present application is disclosed. Here an input screen is provided to the user to permit the user to create and add metadata regarding a mail piece that was not initially processed by the system. For example, a scanned file is imported in field 810. The account type details for a known mail piece type are provided by template including fields 820. Here, the user will input a payment due (premium) field of $56.00 and a due date field 824 of Feb. 12, 2011.

Figures 9, 10:
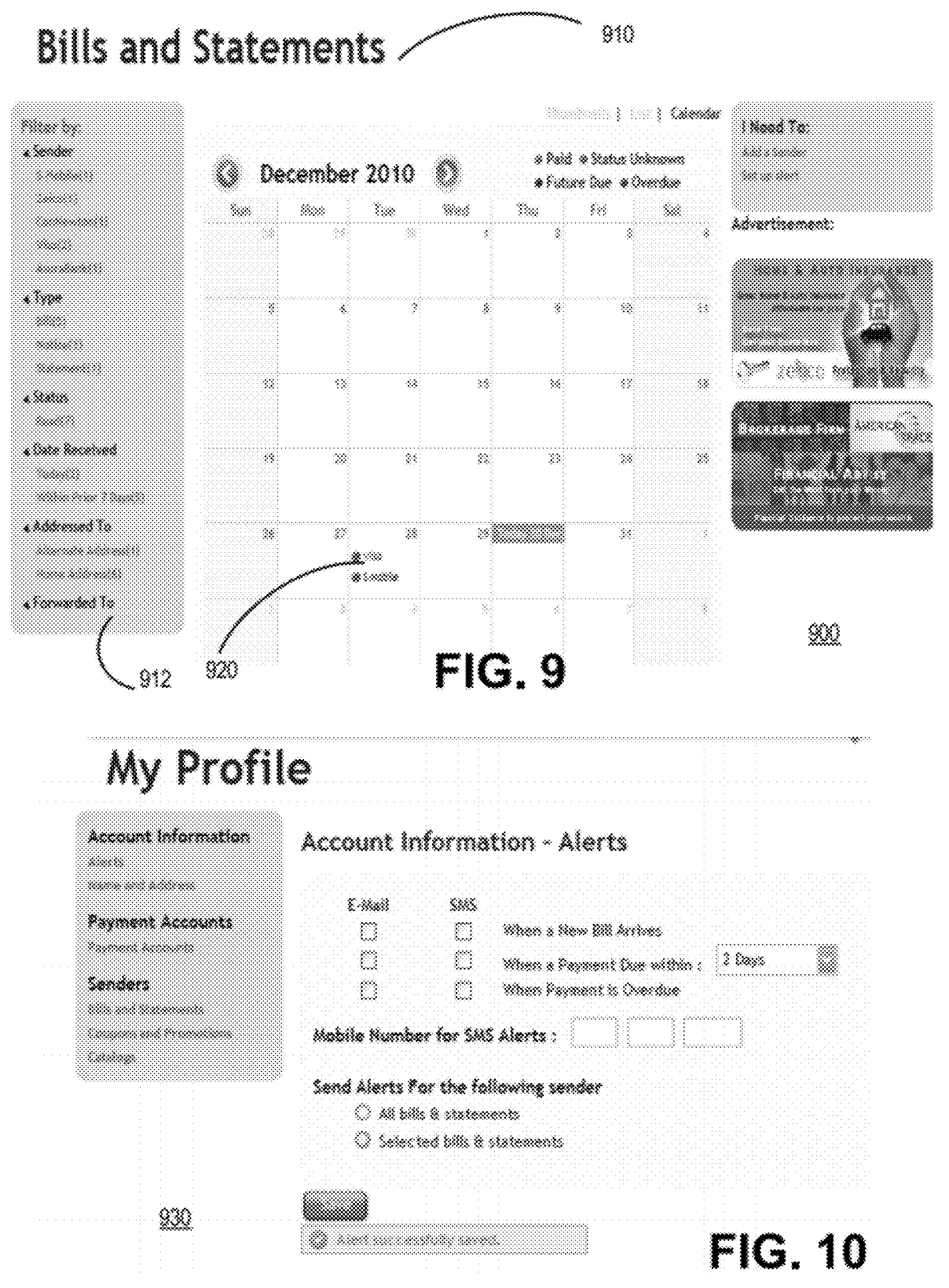

Referring to FIG. 9, a diagram showing a screen display 900 of a calendar view display according to an illustrative embodiment of the present application is disclosed. Here, calendar items of type Bills and Statements 910 are displayed. Two items are shown on Dec. 28, 2010 at items 920. A sorting function is also provided in sub window 912.

Referring to FIG. 10, a diagram showing a screen display 930 of a reminder alert profile setup page according to an illustrative embodiment of the present application is disclosed. The input screen is utilized to setup reminder notification preferences as described above. Also, the user may elect to accept reminder settings from one or more mailers or types of mailers.

Figure 11:
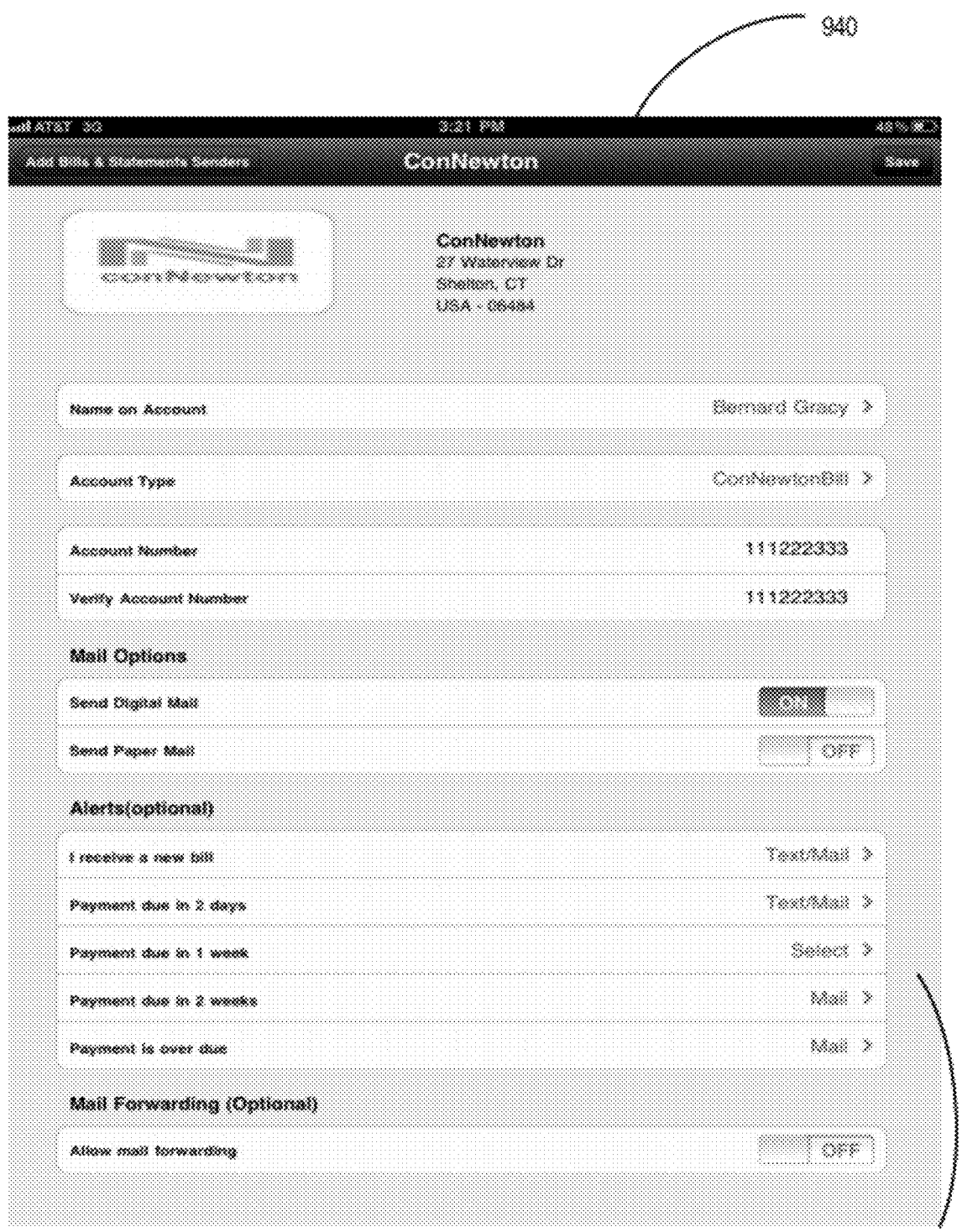
FIG. 11 is a diagram showing a screen display of a reminder alert setup page according to an illustrative embodiment of the present application.

Referring to FIG. 11, a diagram showing a screen display 940 of a reminder alert setup page according to an illustrative embodiment of the present application is disclosed. Here, the user/recipient may select reminder preferences for a single type of mail piece/bill or a single type of mail piece/bill received from a particular sender or a particular single mail piece/bill.

Figure 12:
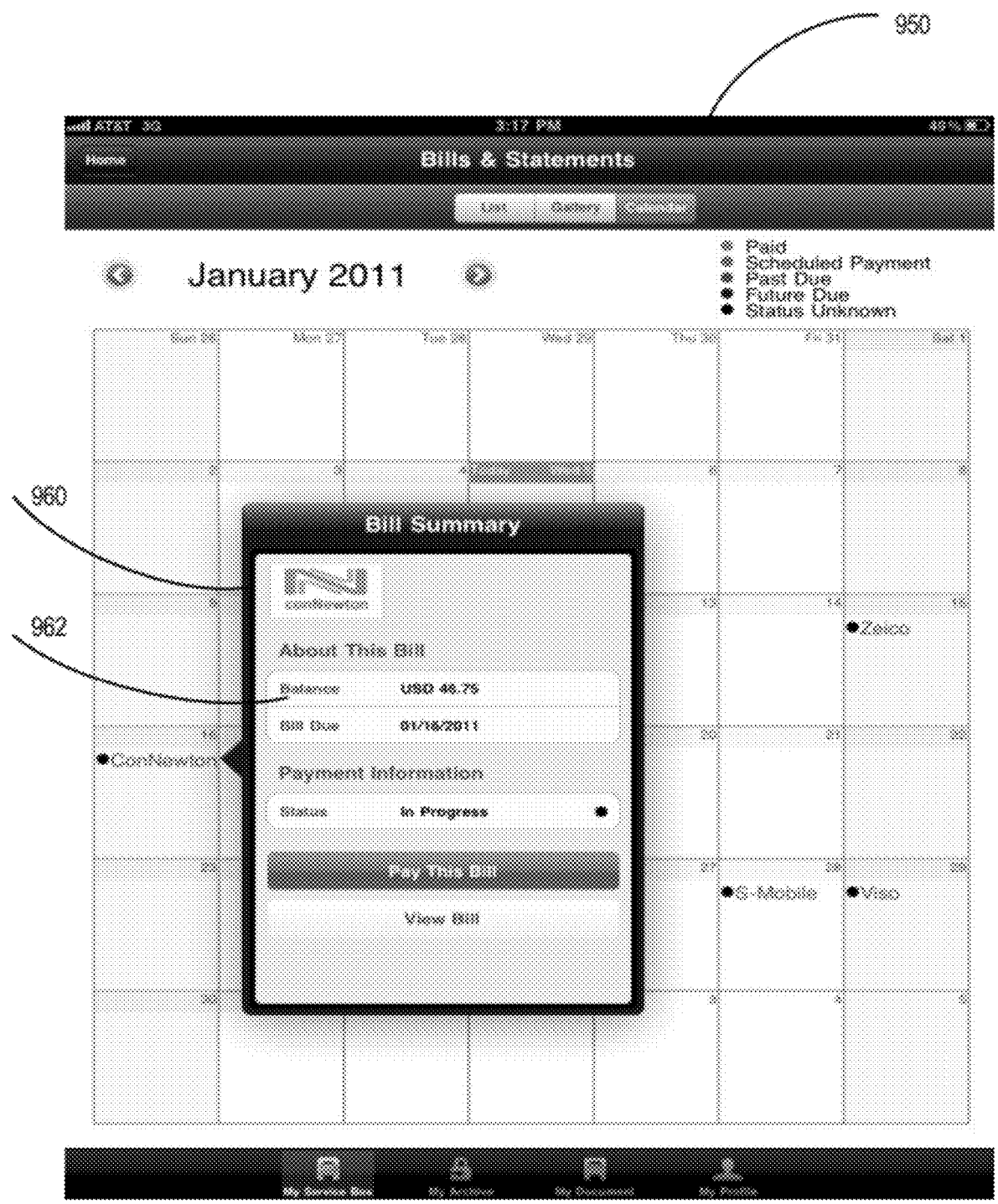
FIG. 12 is a diagram showing a screen display of a calendar view with item detail display according to an illustrative embodiment of the present application.

Referring to FIG. 12, a diagram showing a screen display 950 of a calendar view with item detail display according to an illustrative embodiment of the present application is disclosed. Here the more detailed individual item view is shown having a popup bill display for a single conNewton bill 960 having time sensitive data 962 as described herein.

In yet another illustrative embodiment, a calendar based system for organizing reminders and notices as well as facilitating follow-on actions related to digital documents including mail, transaction statements, marketing promotions, catalogs and rich media is described.

VOLLY provides an effective means for users to manage their mail. VOLLY also provides a very helpful feature to allow users to quickly view their time sensitive data. Users can access the calendar feature in VOLLY and quickly see what bills statements coupons and promotions are due. This is a very helpful tool to users as it enables them to manage their documents without fear of missing a due date. VOLLY, also enables users to set alerts and notification preferences to keep them up to date with any payments or due dates that are pending.

Users can upload time sensitive documents into VOLLY and tag sensitive dates for reminders. VOLLY's convenient data management allows users to set these preferences and visualize them on calendar to help manage their day-to-day life, while also providing a quick at-a-glance reference for alerts and reminders. Using this feature the user can set alert preferences, and also determine how they would like to receive the alert notification.

The SMG or Secure Mailer Gateway is one of the data compilers which help to capture the time sensitive data. When data arrives at the SMG, the SMG pulls the information based upon pre-determined data selection. The SMG will send a flag to VOLLY alerting the user based on their pre-determined notification type. The user will receive their notification when a due date is with their designated time frame.

When the sender submits their information, the payment due date and amount will be noted by VOLLY, and the system will incorporate this information into the users calendar. As the due date approaches based on the users selection (2 days, 3 days etc.,) the system will send a notification to the user reminding them that the bill payment is due. This will help ensure that users will never miss a payment and fall delinquent.

One of the features that the VOLLY provides is to allow users to set alerts for payment due dates or expiration dates. Users can upload their own documents and set notification alerts with various levels of warning, as well as two different notification types, email or SMS. Users can upload various documents related to insurance, utilities, banks (with statement or payment dates) or other personal documents and allow VOLLY to provide adequate reminders and alerts as needed. From the calendar the user can also easily access the bill/statement information. To do this just click on the Bill or Statement in the calendar and the popup screen will appear. From this screen the user can easily pay the bill, Share the bill with another user (Forward), or move the bill into their archive folder.

The Catalogs, Coupons and Promotions page lists the coupons and promotions that the user has signed up to receive. VOLLY also enables the user to receive alerts and notifications to coupons and promotions which may soon expire. This information can be emailed to signal the user, and it can also be logged into their calendar so that opportunities will not go by missed. As a coupon or promotion reaches its expiration date VOLLY will send the user alert notification to warn the user of the impending deadline. Again this will be populated in the user's calendar for easy viewing, and access.

In the described embodiments, illustrative user client devices 390 may include a desktop personal computer, a laptop personal computer, a tablet personal computer, smart-phone and/or PDA or the like. They may be connected to the Internet using a wired connection, a wireless LAN connection and/or wireless WAN/cellular or other suitable alternative. Each of the user client devices is a DELL desktop, laptop or tablet respectively and executes a WINDOWS 7 operating system and an INTERNET EXPLORER browser or a MOTOROLA device such as a DROID 3 or XYBOARD executing the ANDROID operating system or APPLE IPAD or IPHONE executing the iOS operating system. Each client device includes at least one processor, display, input such as a keyboard and mouse, RAM memory for data and instructions, disk memory, network and external storage connections.

If the above mentioned cloud architectures are not used, the server may include a DELL POWEREDGE M1000E server, but other servers may be used including geographically dispersed and/or load balanced servers. Such servers includes at least one processor, RAM memory for data and instructions, disk memory, network and external storage connections. Alternatively, an IBM POWER 795 Server or APACHE Web Server may be utilized. Here, the Internet is utilized for many of the network connections of the systems 100/300, but other networks including LAN, WAN, cellular, satellite and other wired and/or wired networks may be used for one or more of the interconnections shown. The databases storing user login information and user account information may be configured using an available relational database such as ORACLE 12i or MICROSOFT SQL server or APACHE CASSANDRA. Any or all of the databases may be resident in a single server or may be geographically distributed and/or load balanced. They may be retrieved in real time or near real time using networking such as web services connected to third party data providers. Many alternative configurations may be used including multiple servers and databases including a geographically distributed system. The processes described herein may be implemented in C++, Java, C# on a MICROSOFT WINDOWS 7 platform and utilize the ADOBE CQ5 web content management system. Alternatively, PHP code may be used with open source systems and APACHE web server with APACHE CASSNDRA databases. Other alternatives such as the JOOMLA content management system and MYSQL databases may be utilized.

Typical mailers include organizations that create and deliver transactional and periodic physical communications that are often sent by first class mail such organizations including utilities, financial institutions, marketers and government agencies. Such mailers have IT systems that include recipient databases and IT systems used to provide print streams such as legacy mainframe systems that provide print stream data for statements, etc. that may be printed in the native format or reformatted and enhanced before printing. Alternatively, a Mailer may own and operate system.

In certain illustrative embodiments, the system receives a single print stream from a mailer and uses recipient profile data received from the mailer or otherwise obtained from the user to split the print stream into physical and electronic delivery streams. The Physical Distribution subsystem (printing/mailing of hard copy) is implemented in the illustrative embodiment as an automated document factory (ADF) using mail piece creation systems described may be obtained from Pitney Bowes Inc. of Stamford, Conn. that include the PITNEY BOWES SERIES 11 inserter systems, the PITNEY BOWES INTELLIJET printing system, and the PITNEY BOWES DM INFINITY postage meter. The documents produced may include the full range of documents processed in ADFs including direct mail, statements such as monthly or financial transaction statements of accounts, credit cards and brokerage accounts and may also include bills for services and utilities and goods purchased. The physical mail is then delivered to a physical mailbox for the household 70 and accessed by a member of the household.

In alternatives, the Digital Distribution subsystem may be implemented as a combination of email push systems and World Wide Web hosted electronic messaging pull systems. E-messaging system available from the Pitney Bowes Business Insights group may be built into the server.

Additionally, certain redundant communications processing systems have been described. Commonly-owned, co-pending U.S. patent application Ser. No. 12/650,751, entitled System and Method for Providing Redundant Customer Communications Delivery Using Hybrid Delivery Channels, filed by Sagi, et al. on Dec. 31, 2009 describes such systems and is incorporated by reference herein in its entirety. Such systems described therein may be modified using the systems, processes and techniques described herein.

Furthermore, certain print stream processing systems have been described for serving multiple mail recipients in a household. Commonly-owned, co-pending U.S. patent application Ser. No. 12/651,324, entitled System and Method for Electronic Delivery of Mail, filed by Sagi, et al. on Dec. 31, 2009 describes such systems and is incorporated by reference herein in its entirety. Such systems described therein may be modified using the systems, processes and techniques described herein.

Any of the alternatives described herein may be combined and/or interchanged with embodiments and alternatives including individual components thereof as appropriate.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A computer implemented method for sending mail scheduling data to an integrated mail information system, the integrated mail information system used by a first user and a second user, comprising:
   utilizing the computer to process at least one print stream, and in processing the at least one print stream, processing a first mail piece directed to the first user and a second mail piece directed to the second user,
   determining that the first mail piece is to be delivered electronically;
   determining that the second mail piece is to be delivered physically;
   obtaining first time sensitive data from the print stream associated with the first mail piece;
   obtaining second time sensitive data from the print stream associated with the second mail piece;
   creating a first mail scheduling message including the first time sensitive data and calendar data for display in calendar view form;
   creating a second mail scheduling message including the second time sensitive data and calendar data for display in calendar view form;
   sending the first mail piece to the first user electronically;
   sending the first mail scheduling message electronically to the integrated mail information system for display to the first user in calendar view form;
   sending the second mail piece to a physical delivery subsystem fat physical delivery to the second user; and
   sending the second mail scheduling message electronically to the integrated mail information system for display to the second user in calendar view form.

2. The method of claim 1, wherein:
the calendar view form comprises a monthly view.

3. The method of claim 1, wherein:
the first and second mail scheduling messages comprise mail piece type data.

4. The method of claim 1, wherein:
the first mail piece comprises a bill and the first time sensitive data comprises a due date and an amount due.

5. The method of claim 1, wherein:
the second mail piece comprises an offer and the first time sensitive data comprises an offer deadline.

6. The method of claim 1, wherein:
the first mail piece comprises a bill and an offer and the first time sensitive data comprises a due date and an amount due associated with the bill, further comprising:
   obtaining third time sensitive data from the print stream associated with the first mail piece, wherein the third time sensitive data includes an expiration date associated with the offer;

creating a third mail scheduling message including the third time sensitive data; and sending the third mail scheduling message electronically to the integrated mail information system for display to the first user.

7. The method of claim 1, wherein:

the first mail piece comprises a bill and an offer and the first time sensitive data comprises a due date and an amount due associated with the bill, further comprising:

obtaining third time sensitive data from the print stream associated with the first mail piece, wherein the third time sensitive data includes an expiration date associated with the offer; and wherein the first mail scheduling message further includes the third time sensitive data.

\* \* \* \* \*